(12) United States Patent
Braun

(10) Patent No.: US 6,660,998 B1
(45) Date of Patent: Dec. 9, 2003

(54) TIMING DEVICE FOR POSITIONING MACHINE PARTS MOVING ON A STRAIGHT OR CIRCULAR PATH

(75) Inventor: Paul-Wilhelm Braun, Troisdorf (DE)

(73) Assignee: PWB-Ruhlatec Industrieprodukte GmbH, Seebach (DE)

( * ) Notice: Subject to any disclaimer, the term of this patent is extended or adjusted under 35 U.S.C. 154(b) by 73 days.

(21) Appl. No.: 09/625,007

(22) Filed: Jul. 25, 2000

(30) Foreign Application Priority Data

Apr. 6, 2000 (DE) .......................... 100 16 959

(51) Int. Cl.[7] .............................................. H01J 40/14
(52) U.S. Cl. ................. 250/239; 250/231.13; 310/68 B
(58) Field of Search ....................... 250/231.13, 237 R, 250/237 G, 231.14, 231.15, 231.16, 231.17, 231.18, 239; 310/91, 261, 68 B; 341/11, 13

(56) References Cited

U.S. PATENT DOCUMENTS

| 4,132,890 A | * | 1/1979 | Garcia et al. | ........... 250/231.13 |
| 4,203,122 A | * | 5/1980 | King | ............................ 347/160 |
| 4,266,125 A | | 5/1981 | Epstein et al. | ............... 250/231 |
| 5,148,019 A | * | 9/1992 | Kobayashi et al. | .... 250/231.14 |
| 5,665,965 A | * | 9/1997 | Durham, III | ........... 250/231.13 |
| 5,672,865 A | * | 9/1997 | Braun | ......................... 250/233 |
| 5,859,425 A | | 1/1999 | Mleinek et al. | ......... 200/231.13 |

FOREIGN PATENT DOCUMENTS

| DE | 31 18 607 | | 3/1982 | | |
| DE | 36 00 938 | | 8/1987 | | |
| DE | 39 15 679 | | 11/1990 | | |
| DE | 93 04 358 | | 9/1994 | | |
| DE | 196 40 109 | * | 4/1998 | ........... | G01B/11/00 |
| DE | 198 60 106 | | 6/2000 | | |
| JP | 01-027827 | * | 1/1989 | ........... | B23P/21/00 |

* cited by examiner

Primary Examiner—Robert H. Kim
Assistant Examiner—Chih-Cheng G Kao
(74) Attorney, Agent, or Firm—Darby & Darby P.C.; Christa Hildebrand

(57) ABSTRACT

The invention relates to a timing device for positioning a machine part which is moved by an actuator and a control circuit in a straight or circular path inside a housing. A timing disk or a timing ruler is used as a reference point for the positioning, wherein the timing disk or timing ruler is arranged in a beam path of a light source-sensor unit. A beam mask made of a film material is disposed between a light source and the timing disk or the timing ruler. Spacer elements which face the timing disk or timing ruler, and a positioning and mounting plane for registration with a base plate are provided. Also provided are guide means for the positioning the beam mask inside the housing in front of the light source.

16 Claims, 4 Drawing Sheets view indicated by arrow detail A embossed embodiment

Detail B

TIMING DEVICE FOR POSITIONING MACHINE PARTS MOVING ON A STRAIGHT OR CIRCULAR PATH

BACKGROUND OF THE INVENTION

1. Field of the Invention

The present invention relates to a timing device for positioning a machine part which is moved by an actuator and a control circuit in a straight or circular path inside a housing. A timing decive, such as a disk or a timing ruler is used as a reference point for positioning, wherein the timing disk or timing ruler is arranged in a beam path of a light source-receiver unit (LRU).

2. Description of the Related Art

Timing devices of the aforedescribed type are disclosed, for example, in U.S. Pat. No. 5,859,425 (Ruhlatec Industrieprodukte GmbH). With such devices, the light of the radiation source must exit absolutely parallel so as to eliminate parallax errors when the light passes through the timing disk or the timing ruler. The lens systems used for this purpose are complex and quite expensive, but also have the disadvantage of increasing the overall length of the positioning device. Moreover, the optical correction device also has to be accurately positioned which is frequently quite difficult due to the differing designs.

SUMMARY OF THE INVENTION

It is therefore an object of the present invention to develop a device for positioning machine parts that move on a straight or circular path which uses a light source-receiver unit, wherein the light source-receiver unit operates with light sources of arbitrary design while still producing light beams with sufficient parallelism without requiring complex optical correction devices while simultaneously decreasing the overall length along the optical axis. The solution is based on a mask in the form of a film segment, wherein the mask is accurately positioned in the beam path of a light source-receiver unit by segregating and correlating the following functions:

The dimensions in two directions are correlated by the mask and the mask carrier (FIG. 3) and by the mask (FIG. 5), respectively, e.g., alignment in the film plane (2 axes). The third direction is defined through the attachment (e.g., with an adhesive) of the mask on the base plate. The base plate also provides the stability of the system.

The correlation of the dimensions of the mask with those of the timing disk is provided by spacer elements, (e.g., embossed spacers, such as projections or ribs) on the mask carrier (FIG. 4a) and on the base plate (FIG. 6), respectively.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

The solution provided by the invention is based on a mask in the form of a film segment which is accurately positioned along all axes with respect to a timing disk disposed in the beam path of a light source. The solution is implemented by separating the functions and the association of these functions with different components.

The positioning device is composed of a timing disk, a mask carrier, a mask and a base plate and mounted in the beam path between the light source and the receiver. To this end, the timing disk is mounted on the rotating printing roller, whereas the base plate with the mask carrier and the mask is supported on the axis of the printing roller and secured against rotation on the frame. The base plate with the mask carrier and the mask is secured in such a way that a very narrow gap is formed between the timing disk and the mask. For this purpose, spacer elements are provided on the mask carrier which maintain the predetermined spacing when the mask carrier makes contact with or slides on the timing disk.

The base plate and the mask carrier are rigidly connected with each other (for example, with an adhesive). The mask receptacle is supported on the axis of the printing roller and provides through the corresponding mask window dimensional registration between the mask and the timing disk. The base plate operates as a contact surface and attachment surface for the mask in the mask window and provides the stability of the system as well as the attachment to the frame.

The system is attached to the frame after the base plate together with the mask carrier and the mask have been pushed onto the axis of the printing roller and the predetermined spacing (contact between the spacer projections and the timing disk) has been established, which is described in the following:

1. The timing disk is secured on the rotating element (printing roller),
2. The base plate and the mask carrier are aligned and joined with one another (for example, with an adhesive),
3. The mask and the mask carrier are aligned and the mask is attached to the base plate (for example, with an adhesive),
4. The base plate with the mask carrier and the mask are pushed onto the axis of the printing roller, until the spacer elements (e.g., the projections or ribs) make contact with or slide against the timing disk,
5. In this position, the base plate with the mask carrier and the mask are secured to the frame.

Figure 1:
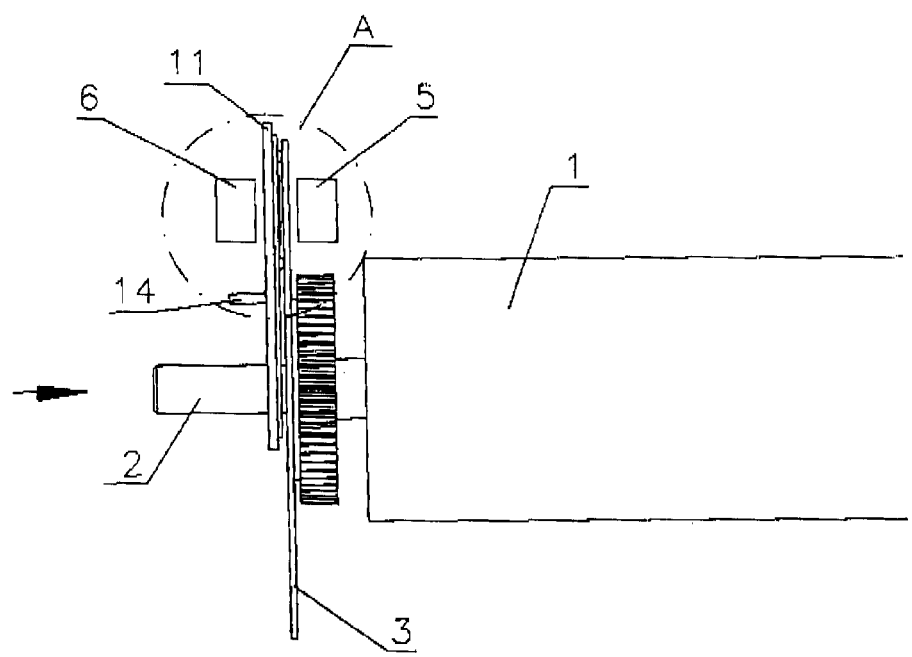
FIG. 1 is a side view of a device according to the invention for positioning rotating machine parts.
Figure 2:
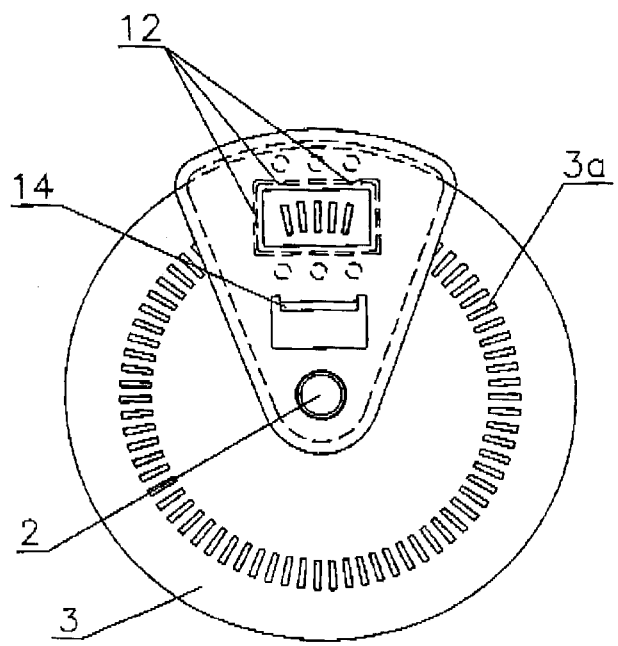
FIG. 2 is a frontal view in the direction of the arrow according to FIG. 1.
Figure 3:
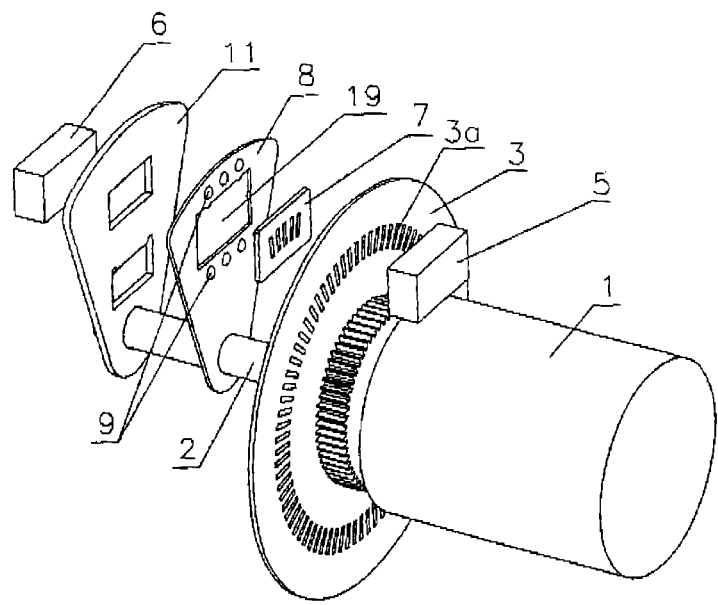
FIG. 3 is an explosive view of the arrangement of FIG. 1.

The rotating machine part of FIG. 1 is, for example, a printing roller 1 (in partial view) which has a timing disk 3 disposed on the drive axis 2.

Markings 3a which are located in the beam path of a light source-receiver unit 5, 6 are arranged on the side of the timing disk 3—in the region of the outer circumference. The light source is selected to match the respective sensor type.

Figure 4A:
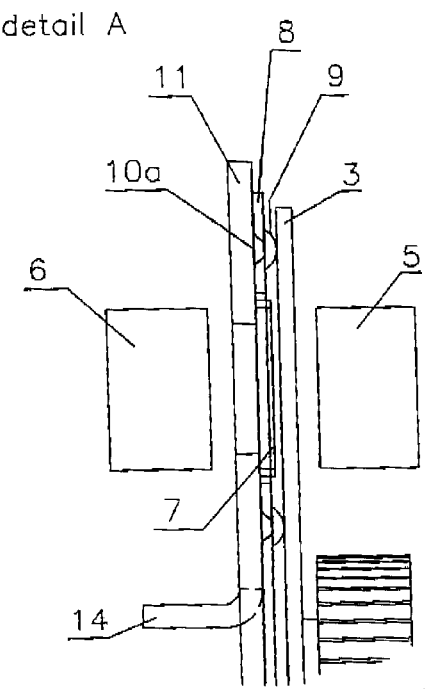
FIGS. 4a, 4b is an enlarged view of two alternative embodiments of spacers as indicated by the section A of FIG. 1.
Figure 4B:
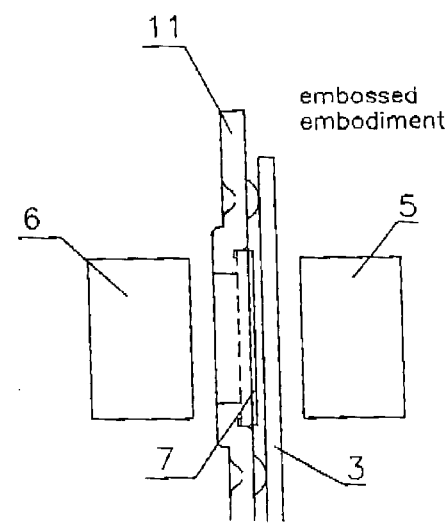

The receiver 5 is attached on one side of the timing disk 3, whereas a radiation source, for example the light source 6, is attached on a housing (not shown) on the other side of the timing disk 3. A beam mask 7 on a mask carrier 8 is positioned in the beam path between the timing disk 3 and the light source 6, wherein the beam mask can be oriented along several 3-dimensional axes. A mounting plane (10a in FIG. 4a, 10b in FIG. 6) adapted for attachment to the base plate 11 is provided on the backside of the mask carrier 8 (as seen from the printing roller 1).

Figure 5:
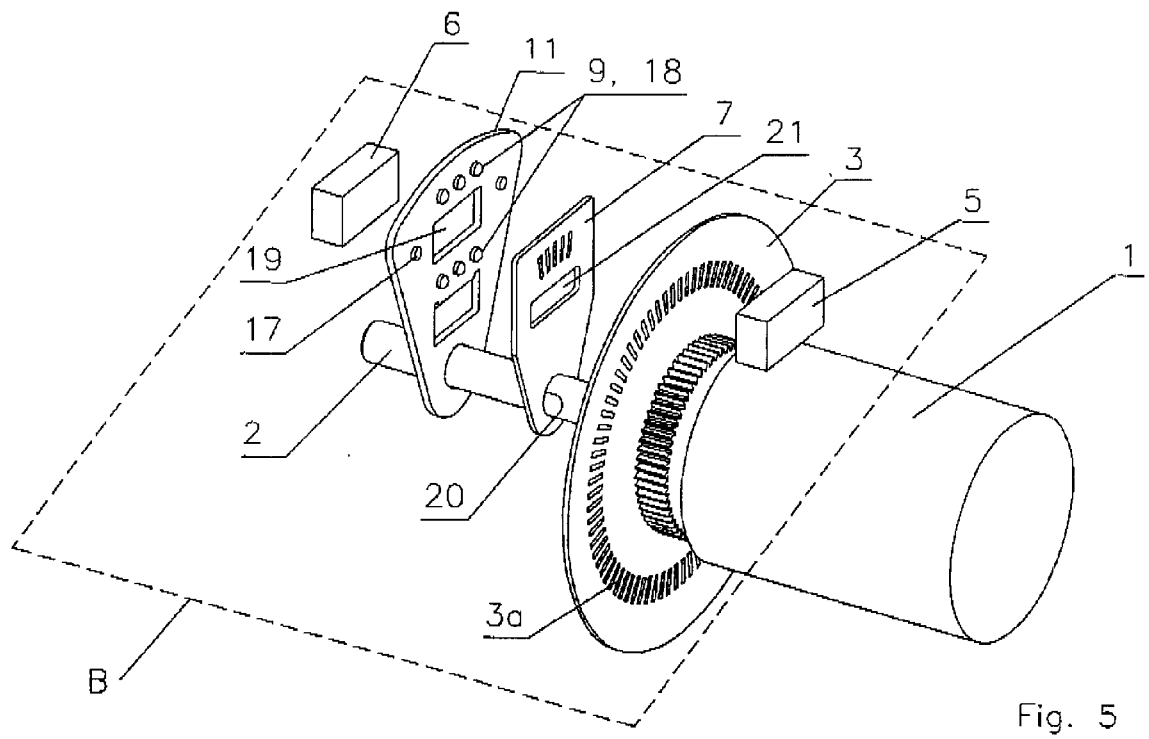
FIG. 5 is an explosive view of an alternative embodiment embodiment of the arrangement of the beam mask according to FIG. 3.

Referring now to FIG. 5, according to an alternative embodiment of the device according to the invention for positioning machine parts moving on a straight or circular path, the mask carrier 8 can also be omitted, with the base plate and the beam mask 7 now assuming the respective functions of the mask carrier. As seen in FIG. 5, the base plate 11 has spacer elements in the form of spacers 9, with the beam mask 7 having the size of the mask carrier, so that the beam mask 7 can be positioned on the drive axis 2 with the, help of a corresponding bore and a guide plane 20.

Figure 6:
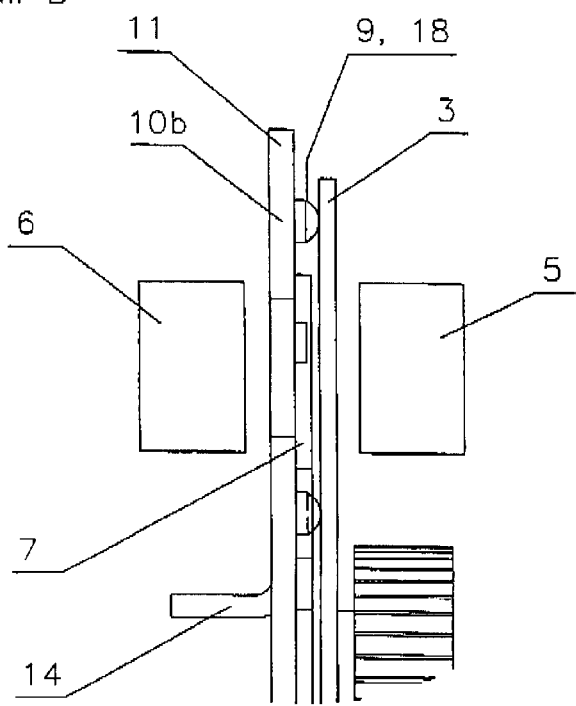
FIG. 6 a partial cross-section of a detail B of FIG. 5.

The alternative embodiment is illustrated more clearly in FIG. 6 which shows a partial cross-section of the detail B of FIG. 5. It can be seen that spacer elements in the form of spacers 9 are provided between the base plate 11 and the timing disk 3 for accurately positioning the two components. The beam mask 7 this attached directly to the.base plate 11 through a adherent surface 10b. A limit stop 14 provides the correct spacing relative to the housing of the positioning device according to the invention (not shown).

Figure 7:
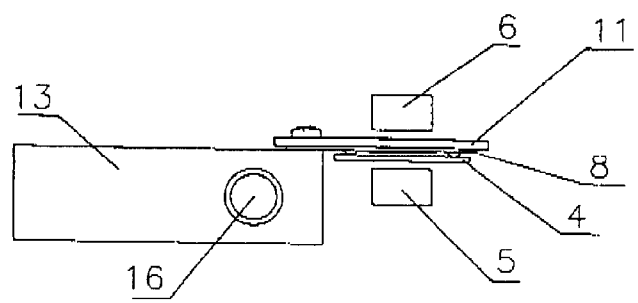
FIG. 7 a side view of a device according to the invention for positioning machine parts moving along a straight path.
Figure 8:
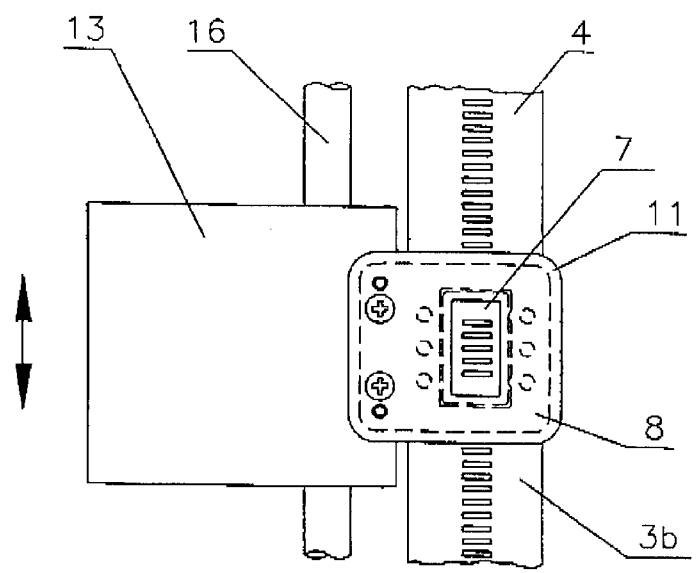
FIG. 8 a top view of a device according to the invention of FIG. 7.
Figure 9:
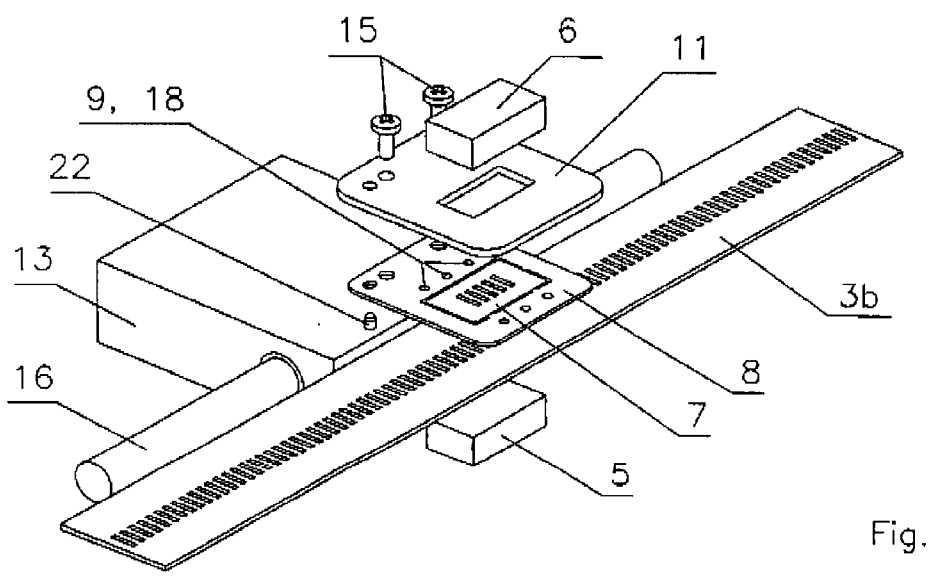
FIG. 9 a perspective explosive view according to FIG. 8.

As mentioned above, the device of the invention can not only be used to accurately position rotating machine parts, but also machine parts moving on a straight path. This is illustrated.in FIGS. 7 to 9, wherein identical parts have identical reference numerals. The mask carrier 8 and the base plate 11 as well as the timing ruler 4, which is to be scanned in the direction of the arrow, are positioned between a receiver 5 and a light source 6.

The mask carrier 8 with the beam mask 7 is mounted on a carriage 13 provided with guide pins 22. Thereafter, the base plate 11 is placed on the mask carrier 8 and attached to the carriage 13 with screws 15. When the carriage 13 moves along the carriage guides 16, the markings 3b traverse the beam path of the light source-receiver unit 5, 6 and can be counted, thereby determining the position of the carriage 13.

The mask carrier 8 can essentially be made of any torsion-resistant material. Preferably, a metallic material is used which can be machined with the required precision. Spacer elements 18 (for example, embossed spacers such as projections or ribs) disposed on the mask carrier 8 or on the base plate 11 provide the dimensional registration of the mask relative to the timing ruler.

The positioning or attachment planes 10a, 10b located on the mask carrier 8 or the beam mask 7 can have orientation marks 17 for adhesive or laser weld joints. Advantageously, the spacers 9 are arranged circumferentially about the window opening 19 of the mask carrier 8. This arrangement helps to maintain the exact spacing between the beam mask 7 and the timing disk 3 or the timing ruler 4, respectively.

With the embodiment illustrated in FIG. 5, the spacers 9, 18 can be pressed through a window opening 21 against the timing disk 3. In this way, the spacing with respect to the base plate 11 can be accurately adjusted.

Thus, a device for positioning a machine part is provided which is moved by an actuator and a control circuit in a straight or circular path inside a housing. A timing disk 3 or a timing ruler 4 is used as a reference point for positioning, with the timing disk 3 or timing ruler 4 arranged in a beam path of a light source-sensor unit 5 and 6. A beam mask 7 made of a film material is disposed between a light source 6 and the timing disk 3 or the timing ruler 4, respectively. Spacer elements 9, 18 are also provided, which face the timing disk and timing ruler, respectively, and a positioning and mounting plane 10a, 10b for registration with a base plate 11. Guide means 12, 14, 22 are provided for positioning the beam mask 7 inside the housing in front of the light source 6. The beam mask 7 may be disposed between the light source 6 and the timing disk 3 or the timing ruler 4 is positioned in the beam path of the light source 6 in a mask carrier 8 and has a window. The mask carrier 8 comprises, on one hand, spacer elements 9, 18 facing the timing disk or the timing ruler and, on the other hand, a positioning and mounting plane 10a, 10b for registration with a base plate 11. The beam mask 7 is formed in such a way that its position on the drive axis 2 and towards the base plate 11 can be adjusted via guide surfaces 20. The plate holders 12 position the mask 7 in the longitudinal and transverse direction of a plane parallel to the plane of the mask carrier 8 or to the base plate 11. When the mask 7 is pressed against the base plate 11 and is thereby fixed in the plane of the base plate 11. The mask carrier 8 may be made of a metallic material. The spacers 9, 18 comprise projections or ribs embossed in the mask carrier 8. The positioning and mounting plane 10a, b includes orientation marks 17 for adhesive or laser weld joints. The base plate 11 may be made of a torsion-resistant material, in particular of a metal, and the mechanical rigidity is sufficient for an oscillation-free attachment to a moveable carriage 13, wherein the base plate 11 together with the mask carrier 8 protrude over the carriage 13. The spacer elements 9, 18 are arranged in the region of the window opening 21 of the mask carrier 8, and are closely spaced thereto.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A positioning device for positioning a machine part which is moved by an actuator and a control circuit along a path inside a housing, wherein a timing device (3) is used as a reference point for positioning, the timing device (3) is arranged in a beam path of a light source (6) associated with a sensor unit (5), the positioning device comprising
   a beam mask (7) made of a film material; and
   guide means (12), (14), (22) for positioning the beam mask (7) inside the housing in front of the light source (6);
   wherein the beam mask (7) is disposed between the light source (6) and the timing device (3) in a mask carrier (8) having a window, wherein the mask carrier (8) integrally comprises spacer elements (9), (18) facing the timing device and maintaining a predetermined spacing between the mask carrier and the timing device by making direct surface contact with the timing device, and wherein the mask carrier (8) further comprises a positioning and mounting plane (10a, 10b) for registration with a base plate (11).

2. The positioning device according to claim 1, wherein the guide means (12, 14) are supported on a drive axis (2) in such a manner that the position of the beam mask can be defined in all three spatial dimensions.

3. The positioning device according to claim 2, wherein the guide means comprise plate holders (12) for positioning the mask (7) in a longitudinal and transverse direction of a first plane parallel to a second plane of one of the mask carrier (8) and the base plate (11).

4. The positioning device according to claim 3, wherein the mask (7) is pressed against the base plate (11) and thereby fixed in the plane of the base plate (11).

5. The positioning device according to claim 4, wherein the mask carrier (8) is made of a metallic material.

6. The positioning according to claim 5, wherein the plurality of spacers (9, 18) comprise projections embossed in the mask carrier (8).

7. The positioning device according to claim 6, wherein the positioning and mounting plane (10a, b) comprises orientation marks (17) for adhesive or laser weld joints.

8. The positioning device according to claim 7, wherein the base plate (11) is made of a torsion-resistant material.

9. The positioning device according to the preceding claim 8, in that the spacer elements (9), (18) are arranged in the region of the window opening (21) of the mask carrier (8), and are closely spaced thereto.

10. The positioning device according to claim 1, wherein the path inside the housing is a straight path.

11. The positioning device according to claim 1, wherein the path inside the housing is a circular path.

12. The positioning device according to claim 1, wherein the timing device is a timing disk.

13. The positioning device according to claim 1, wherein the timing device is a timing ruler.

14. The positioning device according to claim 8, wherein the torsion-resistant material is metal.

15. The positioning device according to claim 2, wherein the beam mask (7) and the mask carrier (8) are united in one integral unit.

16. The positioning device according to claim 2, wherein the mask carrier (8) has at least one opening (21) so that the spacers (9, 18) can be pressed through the at least one opening, whereby the mask (7) is positioned on the base plate (11).

* * * * *